United States Patent [19]
Ichinose

[11] Patent Number: 5,596,360
[45] Date of Patent: Jan. 21, 1997

[54] IMAGE READING APPARATUS WITH A HALF MIRROR

[75] Inventor: Shuuichi Ichinose, Suwa, Japan

[73] Assignee: Seiko Epson Corporation, Tokyo-To, Japan

[21] Appl. No.: 66,071

[22] PCT Filed: Sep. 25, 1992

[86] PCT No.: PCT/JP92/01227

§ 371 Date: May 26, 1993

§ 102(e) Date: May 26, 1993

[87] PCT Pub. No.: WO93/06687

PCT Pub. Date: Apr. 1, 1993

[30] Foreign Application Priority Data

Sep. 26, 1991 [JP] Japan ................... 3-247312
Jun. 15, 1992 [JP] Japan ................... 4-155082

[51] Int. Cl.⁶ ............................... B41J 2/47
[52] U.S. Cl. ............................... 347/256
[58] Field of Search ............ 346/108, 107 R, 346/76 L, 160; 347/256, 258, 259, 260, 241, 134, 135

[56] References Cited

U.S. PATENT DOCUMENTS 3,825,316  7/1974  Amodei ................... 359/483
5,216,527  6/1993  Sharnoff et al. ........... 359/10

FOREIGN PATENT DOCUMENTS 51-112132  10/1976  Japan .
57-93314   6/1982   Japan .
58-156260  9/1983   Japan .
62-149252  7/1987   Japan .
64-2174    1/1989   Japan .

Primary Examiner—Mark J. Reinhart
Attorney, Agent, or Firm—Ladas & Parry

[57] ABSTRACT

An image reading apparatus high in illumination efficiency which can illuminate an image reading position by use of at least one polarizing element is disclosed. The image reading apparatus can illuminate an object to be image read sufficiently, even if the object is floated away from a predetermined image reading position. In the image reading apparatus, the major illumination light L2 from an illumination unit 1 and the light L2 reflected from the object and then introduced onto light-electricity transducing elements are located on substantially the same plane, and further the polarizing elements 2 and 3 are interposed between the illumination unit 1 and the object 20 and between the object 20 and the light-electricity transducing elements 7, respectively.

5 Claims, 7 Drawing Sheets

IMAGE READING APPARATUS WITH A HALF MIRROR

TECHNICAL FIELD

The present invention relates to an image reading apparatus used for an image scanner, digital copying machine, facsimile, etc. to read images into a computer, mainly.

BACKGROUND ART

The image reading apparatus is generally composed of an illumination unit, an image forming system such as a lens, and light-electricity transducing elements. The composing elements required for reading an image are substantially the same in the image scanner, the digital copying machine, and the facsimile, therefore these composing elements are described by taking the case of an image scanner, by way of example.

In the ordinary image reading apparatus, a linear light source such as a mercury fluorescent lamp or halogen lamp is used as the illumination unit; a lens of about (7 against 1) reduction ratio is used as the image forming system; and linearly arranged CCDs are used as the light-electricity transducing elements. An example of the prior art image reading apparatus is disclosed in Japanese Published Unexamined Patent Application No. 60-148269. FIG. 9 is a cross-sectional view showing this prior art image reading apparatus, in which the light reflected from an image 20 illuminated by an illumination unit 22 is image formed on the CCDs 25 of the light-electricity transducing elements through a mirror 23 and a lens 24 which constitute an image forming system. In the image forming system as described above, in order to increase the image reading speed, the following four methods have been so far adopted: (1) the sensitivity of the light-electricity transducing elements 25 has been increased; (2) a bright lens has been used by increasing the aperture ratio (F-number) of the image forming system 24; (3) the quantity of light from the illumination unit 22 has been increased; and (4) the quantity of light applied onto the light-electricity transducing elements 25 has been decreased to increase the reading speed, with decreasing the S/N ratio; that is, with deteriorating the image quality. Conventionally, the reading speed has been so far improved mainly by increasing the quantity of light emitted from the illumination unit 22 as described in item (3) above.

However, when the image reading speed is required to be further improved to such an extent that 20 pieces of A4-sized paper image can be read per minute, for instance such as in the case of an analog copying machine, if the quantity of light from the illumination unit is simply increased, the size of the image reading apparatus is inevitably increased. This is because a heat radiation plate or an exhaust heat fan are additionally required to exhaust heat generated by the illumination unit and further an additional air flow path will be necessary to exhaust the heat.

In the prior art optical system, the utilization efficiency of light emitted from the illumination unit is very low. Here, "illumination efficiency" can be defined by taking a ratio of the quantity of light for illuminating an object to be image read to the quantity of light for illuminating an area on the object to actually read the image. FIG. 10 shows a distribution of the quantity of light for illuminating the object 20 to be image read. As shown in FIG. 10, the ordinary illumination unit of the image reading apparatus illuminates a width of about 10 to 30 mm in the secondary scanning direction on the object 20 to be image read. Here, when taking into account the case where the reading width is 300 dpi, the light is applied upon a width of 30 mm at the maximum in order to read an image of an object 20 in about 85 µm width. That is, the illumination efficiency is 0.85% to 0.28% in accordance with the following equation:

Illumination efficiency = Reading width × 100/Illumination width

In other words, the light of 99.15 to 99.72% is not only wasted but also needlessly illuminates the area other than is necessary to read the image, thus causing the generation of stray light. As a result, there arises a problem in that the quality of gradient in the read image is deteriorated markedly.

The reason why the illumination width as wide as 10 to 30 mm is secured in the prior art image reading apparatus is to keep the quantity of illuminating light at a constant level at the image reading position even if the object 20 is somewhat floated upward from the base position. FIG. 11 is an illustration for assistance in explaining the above-mentioned reason, which is an enlarged view showing the image reading position shown in FIG. 9. The central ray of light La for illuminating an object 20 is allowed to be incident upon the object 20 at an angle of 45 degrees, for instance. Here, assuming that the object 20 is floated up by a distance Δh from a glass base 21, the position P1 at which the central ray of light La emitted from the illumination unit 22 illuminates the object 20 is shifted to the position P2. In this case, however, since the optical image reading system is located on the optical axis Lb, the position at which the object 20 to be image read is still kept at the position P1'. In other words, there exists an offset Δy between the central position P2 of the illumination light and the image reading position P1'.

Consequently, in order to read the object 20 floated upward away by 20 mm from the glass base 21, for instance, it is necessary to secure the width of the illumination light to such an extent as to correspond to the above-mentioned distance of the object 20 from the glass base 21 in the secondary scanning direction (in a term of the image reading apparatus) or in the arrow direction (shown at the center of FIG. 11). The illumination efficiency is deteriorated by the reason as described above.

DISCLOSURE OF THE INVENTION

The object of the present invention is to provide an image reading apparatus of high illumination efficiency, which can illuminate efficiently a position at which an object to be image read is located. The other object of the present invention is to provide an image reading apparatus low in the light output of the illumination unit, high in image reading speed, and compact in construction.

The present invention provides an image reading apparatus comprising: illuminating means for illuminating an object to be image read with linearly polarized light; shutting means for shutting off regular reflection light component included in the light reflected from the object on a plane substantially the same as the linearly polarized light for illuminating the object; and light-electricity transducing means for transducing the reflection light component other than the regular reflection light component into electric signals.

BEST MODES FOR EMBODYING THE INVENTION

A first embodiment of the image reading apparatus according to the present invention will be described hereinbelow with reference to the attached drawings.

Figure 1:
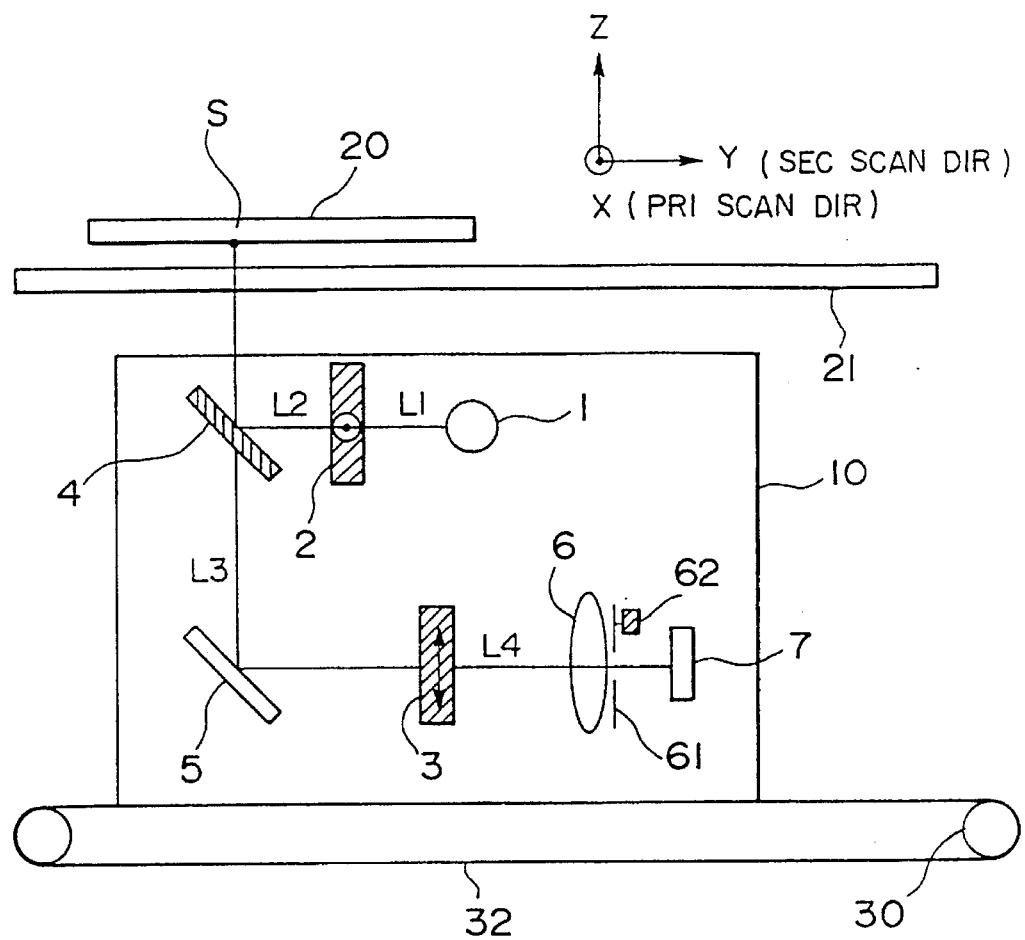
FIG. 1 is a cross-sectional view showing an essential portion of a first embodiment of the image reading apparatus according to the present invention.

As shown in FIG. 1, an illumination unit 1 is a linear light source such as a halogen lamp. The light L1 emitted by the illumination unit 1 is transformed on an X-Y-Z coordinate system into polarized light L2 of the X-axis direction (a vertical direction on the paper) through a polarizer 2 (first polarizing element). After having been reflected by a half mirror 4, the light L2 illuminates an object 20 to be image read. The light L3 reflected by the object 20 is passed through the half mirror 4, reflected by a mirror 5, and then passed through an analyzer 3 (second polarizing element). The polarization direction of this analyzer 3 is the Z-axis direction. The light L4 passed through the analyzer 3 is image formed on light-electricity transducing elements 7 through an image forming system 6 composed of a group of lens. The image forming system 6 is so arranged that an image of the object 20 can be image formed on the light-electricity transducing elements 7 at a reduction ratio of 7 against 1, for instance.

In the image reading apparatus shown in FIG. 1, the X-axis is referred to as the primary scanning direction, and the Y-axis is referred to as the secondary scanning direction.

Here, the functions of two polarizing elements of the polarizer 2 and the analyzer 3 will be described. In designing a prior art image scanner as an example of the conventional image reading apparatus, the optical path of the light emitted by the illumination unit for illuminating an object is usually arranged at an angle of about 45 degrees with respect to the optical path of the light reflected from the object and then led onto the light-electricity transducing elements 7. This is because when a lustrous object such as a photograph is image read, the read image is deteriorated by the light of regular reflection component. The light of the regular reflection component not only deteriorates the precision of photographic density markedly, but also results in an image which is out of focus.

In contrast, in the embodiment of the present invention, the illumination light L2 and the reflected light L3 are both located substantially on the same plane. Therefore, the light L3 reflected from the object 20 shown in FIG. 1 is mixed with the light of regular reflection component. However, the regular reflection component light is the polarized light of the same direction (X-axis direction) as the polarizer 2, so that the regular reflection component light is almost shut off by the analyzer 3 arranged in the direction (Z-axis direction) perpendicular to the polarization direction (X-axis direction) of the polarizer 2. On the other hand, the light reflected from the object 20 other than the regular reflection light component, that is, the diffusion reflection light includes polarization components of various directions determined according to the shape of the object 20. Therefore, the light reflected from the object 20 can be passed through the analyzer 3. On the basis of the above-mentioned function attained by the polarizer 2 and the analyzer 3 in combination, it is possible to eliminate the light of the regular reflection component reflected from the object 20, in order to prevent the image quality from being deteriorated.

The reading operation will be described hereinbelow. The above-mentioned optical system is mounted on a carriage 10, and illuminates a part of rows S (extending in the X-axis direction or the primary scanning direction) on an image-read object 20 placed on a glass base 21. Further, the reflected light is image formed on the light-electricity transducing elements 7. The light-electricity transducing elements 7 are of a linear image sensor such as CCDs. Therefore, it is possible to read image data corresponding to one column portion of the partial row S on the object 20 through an electronic circuit (not shown). Thereafter, the carriage 10 is moved in the Y-axis direction in FIG. 1 by a distance corresponding to the resolving power by driving means 30 through a timing belt 32. By repeating the above-mentioned operation, it is possible to read the image all over the object 20 to be image read.

In the above-mentioned image reading apparatus, since the illumination light L2 and the light L3 reflected from the object 20 are located on a plane including the Y-axis and the Z-axis perpendicular to the X-axis as the primary scanning direction to the surface of the object 20 even when the object 20 floats away upwardly; possible to illuminate the same position of the object 20. Accordingly, it is possible to prevent the quantity of illuminating light from being reduced due to the floating-up of the object 20, being different from the case of the prior art image reading apparatus. In addition, since only an illumination width according to the width to be image read is determined, it is possible to reduce the quantity of illumination light markedly, as compared with that of the prior art illumination unit.

Here, the required quantity of illumination light will be compared between the prior art apparatus and the apparatus of the present invention. In the prior art image reading apparatus, if the intensity of illumination light on an object 20 is 2000 lux, and the illuminated area is 22 cm long and 3 cm wide, the required quantity of luminous flux is 13.2 lumen. On the other hand, in the case of the present embodiment, if the intensity of illumination light is 2000 lux, and the illuminated area is 22 cm long and 0.0085 cm (=300 dpi) wide, the required quantity of luminous flux is 37.4 millilumen. In the case of the present embodiment, since the light transmissivity of the polarizer 2 and the analyzer 3 is approximately 10%, an extra quantity of light is required for the illumination unit 1 under consideration of the quantity of light to be cut-off through these polarizing elements. When 10 times quantity is assumed to be required, the required quantity of luminous flux is about 0.4 lumen, in practice.

As understood by the above-mentioned comparison, in the image reading apparatus according to the present invention, there exists an advantage in that the required quantity of illumination light is about one-thirtieth (1/30) at the maximum of that of the prior art illumination light.

The above-mentioned advantage results in the fact that the power of the illumination unit can be reduced; the size of the image reading apparatus can be reduced; and simultaneously the image reading speed can be increased 30 times, in the case where the illumination unit having an optical output the same as that of the prior art illumination unit is used.

Additionally, in the image reading apparatus according to the present invention, since the illumination light L2 and the reflected light L3 are both located on the same plane, it is possible to provide an image reading apparatus which can read, without producing any shade portions, images of three-dimensional objects, for instance such as fruit as cherries, two sheet of photographs stuck together with paste and therefore having a stepped portion, books or magazines opened and therefore having sloped surface portions, etc.

Further, when the a diaphragm 61 whose diameter is adjustable is provided for the image forming system 6 to increase the aperture ratio (F-number) of the image forming system, it is possible to broaden the focusing range in the direction that the object 20 is floated away from the surface of the glass base 21. In this case, for example, the variable diaphragm 61 is so constructed as to be adjustable in response to a control signal applied to a diaphragm driving system 62 from a host computer (not shown). Further, the user selects any given allowable floating distance of an object upward away from the glass base, according to the necessity, so that the image can be located in focus within the range between 30 to 3000 mm in the Z-axis direction away from the glass base 21. As a result, it is possible to read an image of three-dimensional object 20 such as a wrist watch, a gem, a stuffed doll, etc. in addition to a sheet-like object, without producing any out-of-focus images.

Figure 2:
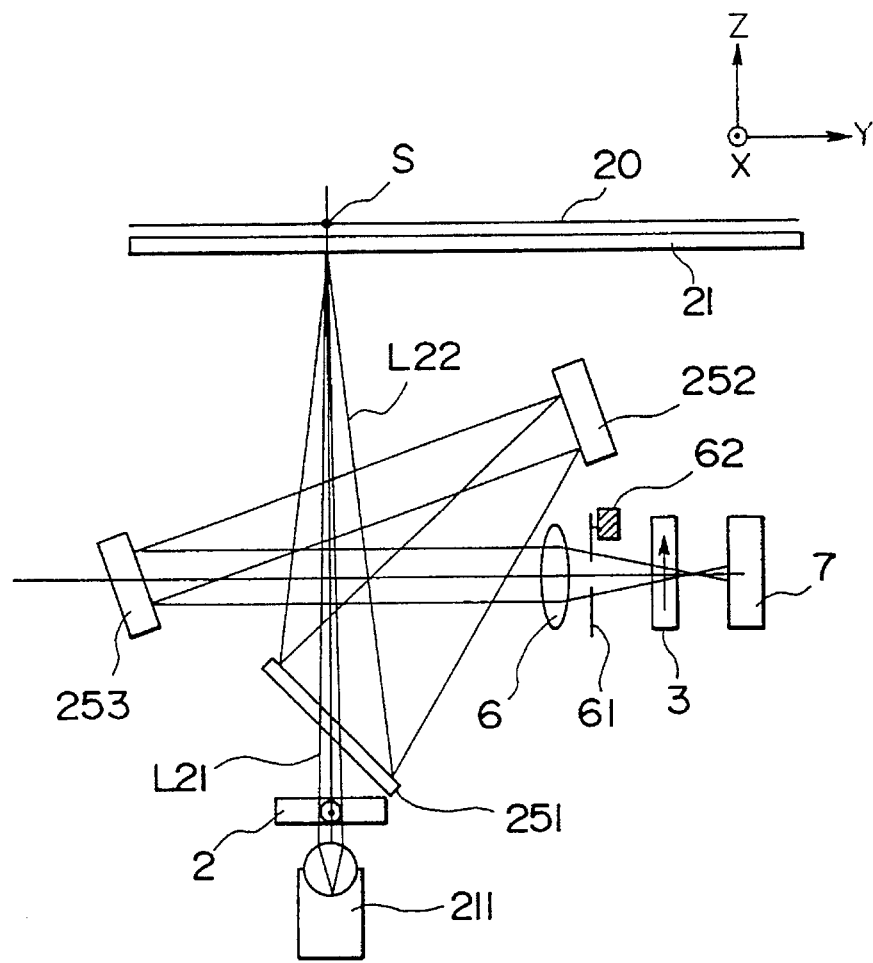
FIG. 2 is an illustration showing an essential portion of a second embodiment of the image reading apparatus according to the present invention.
Figure 3:
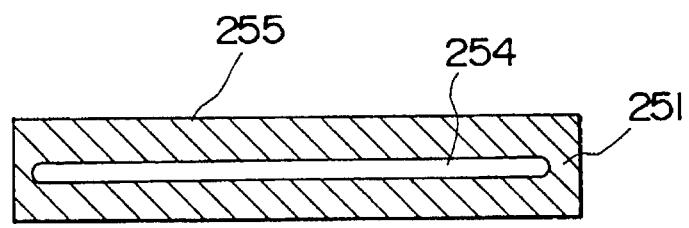
FIG. 3 is a front view showing a partial reflection mirror used for the image reading apparatus shown in FIG. 2.

FIG. 2 shows a second embodiment of the image reading apparatus according to the present invention, in which a linear polarizing element 2 is interposed between a partial reflection mirror 251 and an illumination unit 211. Further, FIG. 3 shows the partial reflection mirror 251. This partial reflection mirror 251 is formed by vacuum-depositing aluminum thereonto, except the middle portion extending along the longitudinal direction thereof. Further, a linear polarizing element 3 having a polarization component in the Z-axis direction is interposed between the image forming system 6 and the CCDs 7 of the light-electricity transducing elements.

The light L21 transmitted by an illumination unit 211 is transformed into the linear polarized light of the X-axis direction through a linear polarizing element 2, passed through a slit 254 formed in the partial reflection mirror 251, and then applied substantially perpendicularly upon a reading position S of an object 20. A regular reflection component light mixed with the light L22 reflected from the object 20 is reflected by an outer perimeter portion 255 of the partial reflection mirror 251, further reflected by two mirrors 252 and 253, and then passed through the image forming system 6. In this case, however, since the direction of linear polarization of the regular reflection light is in the X-axis direction, the regular reflection light cannot pass through the polarizing element 3 of Z-axis direction.

On the other hand, a diffusion light component also reflected by the object 20 is reflected by the outer perimeter portion of the partial reflection mirror 251, reflected by the mirrors 252 and 253, and then passed through the image forming system 6. Further, at least some of the diffusion light is in the Z-axis direction can pass through the linear polarizing element 3. As a result, reflection light L22 of the object 20 is image formed on the CCDs 7, so that the image can be read.

In this embodiment, the illumination light L21 emitted from the illumination unit 211 is very high in directivity, so that the illumination light can illuminates the reading position S of the object 20 mounted on the glass base 21 effectively from a position 50 mm or more far away from the object 20.

Figure 4:
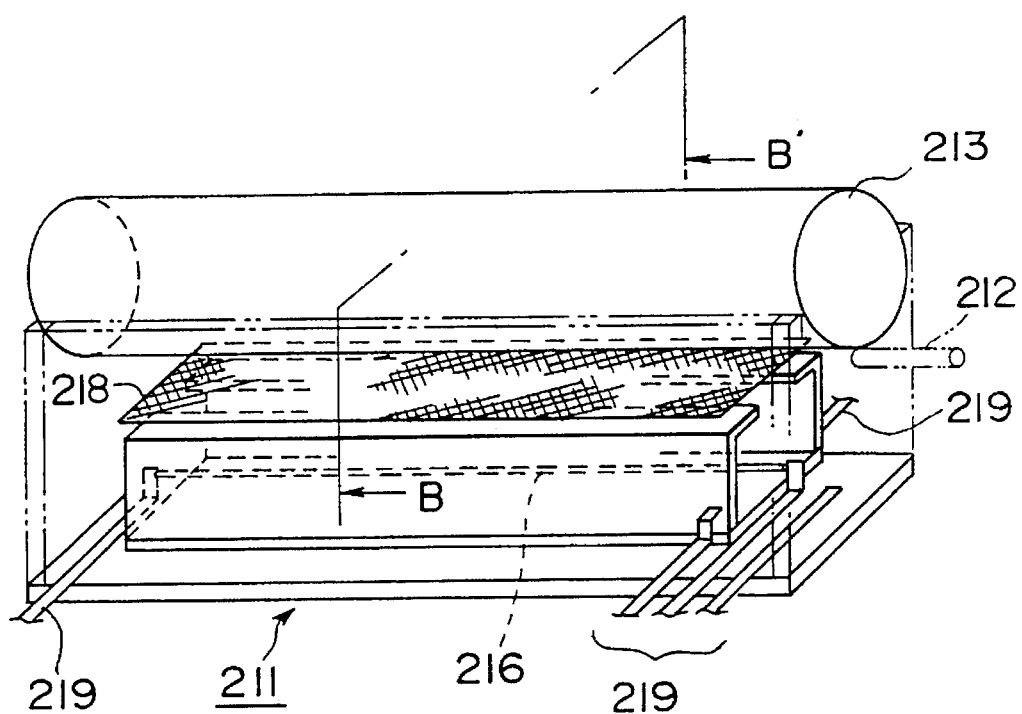
FIG. 4 is a perspective view showing an illumination unit used for the image reading apparatus shown in FIG. 2.
Figure 5:
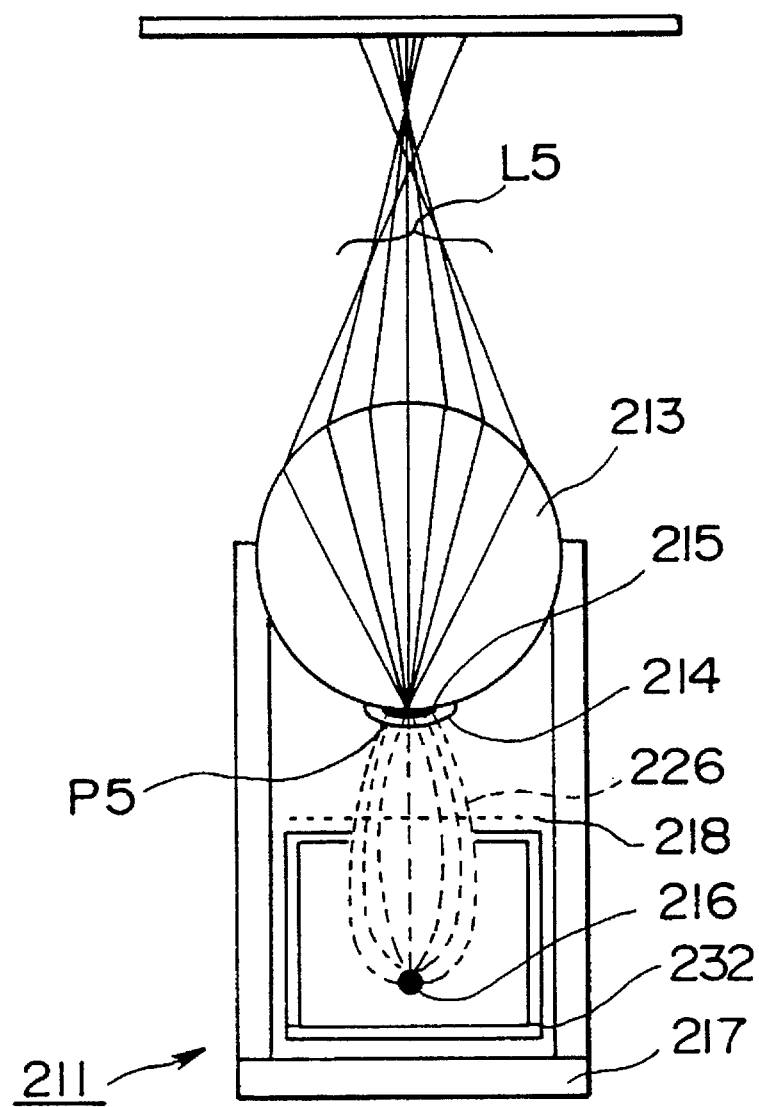
FIG. 5 is a cross-sectional view showing the image reading apparatus, taken along the line B—B' in FIG. 4.

The reason why the luminous flux of high directivity is emitted from the illumination unit 211 is as follows: FIG. 4 is a perspective view showing the illumination unit 211, and FIG. 5 is a cross-sectional view taken along the line B—B' shown in FIG. 4. The illumination unit 211 is manufactured by forming an air-tightly closed glass vessel as shown in FIG. 4, evacuating the glass vessel down to such an extent of $10^{-3}$ to $10^{-5}$ Pascal in degree of vacuum through an evacuation tube 212 made of glass, and by heating the glass with gas combustion to melt the tube and to seal the vessel. The light converging member 213 is formed of glass and into cylindrical shape. At a part of the inside of the illumination unit 211, a fluorescent substance 215 for cathode luminescence from 0.1 to 100 mg/cm$^2$ and most preferably 4 mg/cm$^2$ is applied in strip fashion along the longitudinal direction thereof, and further the applied fluorescent substance 215 is covered by an anode 214 having a thickness form 0.1 to 0.4 μm and formed by vacuum-depositing aluminum as shown in FIG. 5. A practical example of the fluorescent substance is ZnS:Cu, Al.

Further, as shown in FIG. 4, a cathode wire 216 is provided so as to extend along and over an inner backboard plate 217. The cathode wire 216 is a fine wire made of tungsten and having a diameter of 5 to 100 μm, which is covered with an electron emitting substance such as barium oxide (not shown), for instance to increase the thermoelectron emitting efficiency. Further, a grid 218 is arranged between the anode 214 and the cathode 216. The grid 218 is a net-like thin metallic plate made of stainless steel, nickel, aluminum, etc. and formed with holes manufactured by punching-out or electrocasting. Further, a U-shaped backboard electrode 232 is interposed between the cathode wire 216 and the backboard plate 217.

The above-mentioned cathode wire 216 and the backboard electrode 232 are connected electrically to external terminals provided away from the illumination unit 211 through leads 219 shown in FIG. 4.

The operation of light emission will be described herein below. When current is passed through the cathode wire 216 by a power source (not shown), thermoelectrons 226 are generated from the surface of the cathode wire 216 due to the Joule heat. The generated thermoelectrons are accelerated toward the anode 214 to which a high tension of about 8 kV is applied. The thermoelectrons emitted against the anode 214 pass through the anode 214 of thin film aluminum, and excite the fluorescent substance 215 to emit visible radiation L5 to the outside of the illumination unit 211 on the basis of the principle of cathode luminescence light emission.

The light converging member 213 will be described hereinbelow. As already described, this light converging member 213 is of a glass cylinder to which a fluorescent substance 215 is applied in stripe fashion. The width of the stripe is from 0.1 to 10 mm, which is adjusted according to the quantity of the emitted light. The current density of the emissive thermoelectrons 226 is determined by the brightness saturation of the fluorescent substance, and therefore about 200 $\mu A/cm^2$ at the maximum. The visible radiation L5 generated from the lower end portion P5 of the light converging member 213 are emitted as a planar light ray of high directivity by the function of the optogeometrical lens of the light converging member 213.

To obtain the illumination unit of a high directivity, it is possible to adopt other methods of using an LED array and emitting light through a light converging member similar to that of the second embodiment.

Figure 6:
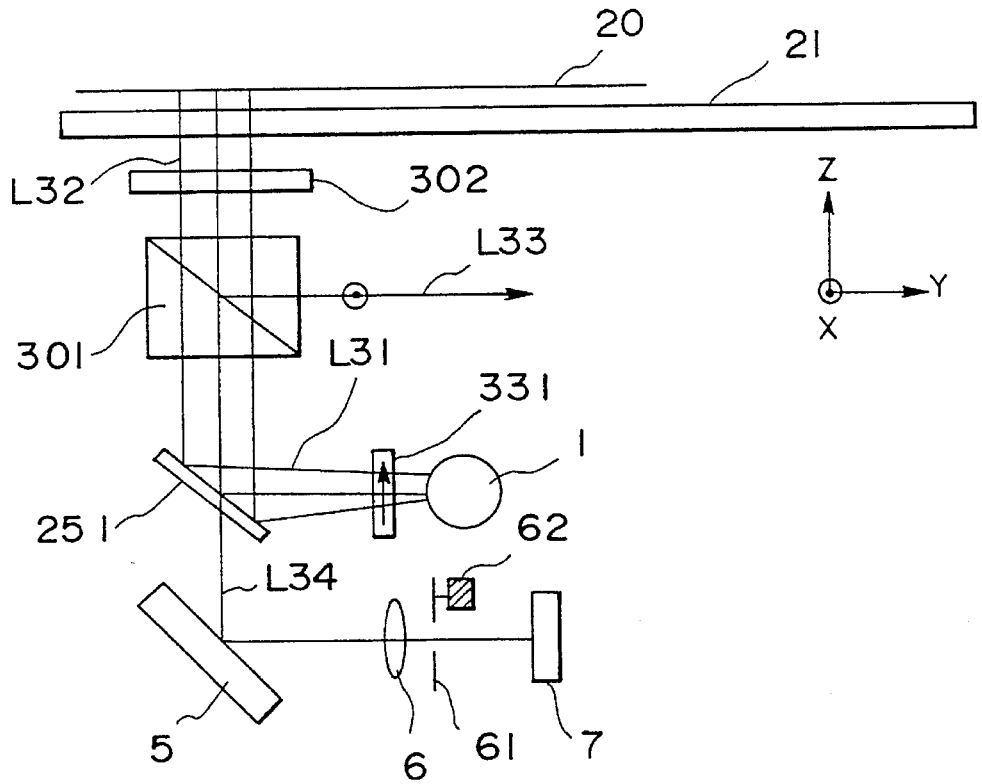
FIG. 6 is a cross-sectional view showing an optical reading system used for a third embodiment of the image reading apparatus according to the present invention.

FIG. 6 shows a third embodiment of the present invention, in which a polarized beam splitter 301 and a quarter wavelength element 302 are interposed between the partial reflection mirror 251 and the object 20.

The behavior of the light along the optical path will be described. The light L31 emitted by the illumination unit 1 is transformed into a linearly polarized light of Z-axis direction (shown in FIG. 6) through a linearly polarizing element 331, and then reflected by a partial reflection mirror 251 toward an object 20 along an optical path roughly perpendicular to the object 20. Here, a polarized beam splitter 301 is provided with the function of passing light other than the linear polarized light of X-axis direction, so that the light L31 is passed perfectly through the polarized beam splitter 301 with a transmissivity of about 100%.

The quarter wavelength element 302 is provided with the function of transforming the linearly polarized light into circular polarized light, so that the light L32 for illuminating the object 20 is circular polarized light. The regular reflection light of the light reflected from the object 20 is the circular polarized light, but transformed into the linearly polarized light after passed through the quarter wavelength element 302. When passed through the quarter wavelength element 302 twice, since the linearly polarized light is rotated 90 degrees with respect to the polarization direction, the regular reflection light reflected from the object 20 and allowed to be incident upon the polarized beam splitter 301 becomes a linearly polarized light L33 having the vibration component of X-axis direction. The linearly polarized light is reflected at a right angle by the polarized beam splitter 301 without being passed therethrough. The diffusion reflection light L34 (other than the regular reflection light) of the light reflected from the object 20 is passed through the polarized beam splitter 301, passed through the slit 254 of the partial reflection mirror 251, reflected by the mirror 5, and then image formed on the CCDs 7 of the light-electricity transducing elements through the image forming system 6.

Since the number of the polarizing element 331 is only one, it is possible to secure a light transmissivity of more than 20%. Therefore, there exists such an advantage that the light utilization efficiency of the overall optical system can be improved high. As a result, it is possible to provide an image reading apparatus high in reading speed, in spite of the illumination unit 1 of a small quantity of light.

Figure 7:
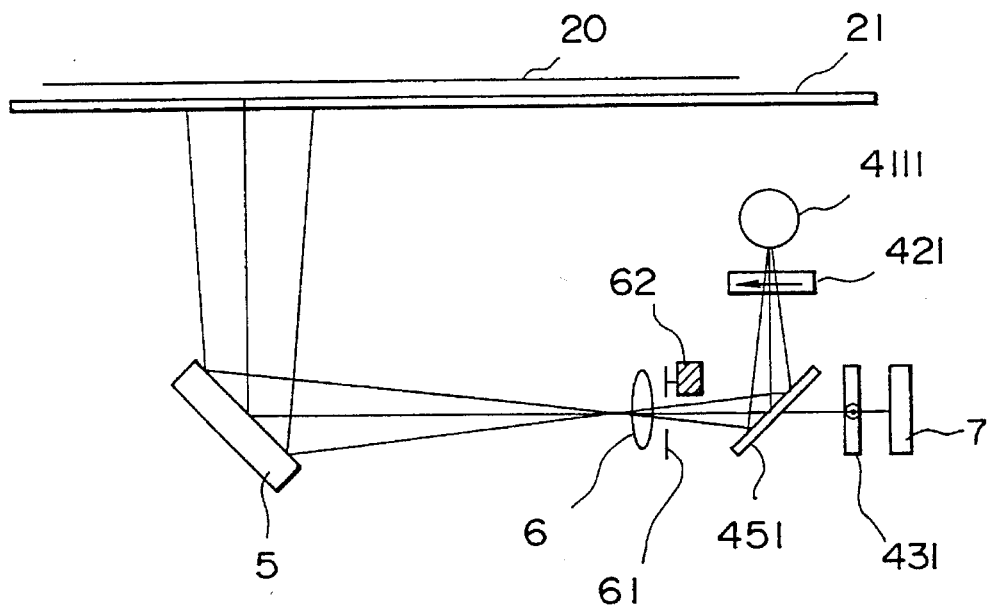
FIG. 7 is a cross-sectional view showing an optical reading system of a fourth embodiment of the image reading apparatus according to the present invention.

FIG. 7 shows a fourth embodiment of the present invention. In this embodiment, an illumination unit 411, a first polarizing element 421, a partial reflection mirror 451, a second polarizing element 431, and CCDs 7 of light-electricity transducing elements are all arranged on the side of the CCDs 7 relative to the image forming system 6, that is, between the image forming system 6 and the CCDs 7. The first polarizing element 421 and the second polarizing element 431 are so arranged that the linearly polarization directions are perpendicular to each other, in order to remove the regular reflection light component of the light reflected from the object 20 and to introduce only the diffusion reflection light onto the CCDs 7.

In the case where the reading width of the object 20 is 22 cm in the primary scanning direction (corresponding to A4 size), if the image is formed on the CCDs 7 through the image forming system 6 of one-seventh ($\frac{1}{7}$) reduction ratio, the size of the image is about 3 cm. Since the illumination unit 411 is disposed on the CCD 7 side relative to the image forming system 6, the light emitting length of the illumination unit 411 is about 3 cm, thus realizing a small-sized apparatus. In addition, the lengths of the partial reflection mirror 451, the first polarizing element 421, and the second polarizing element 431 can be reduced to about 3 cm, thus it being possible to reduce the parts cost.

Figure 8:
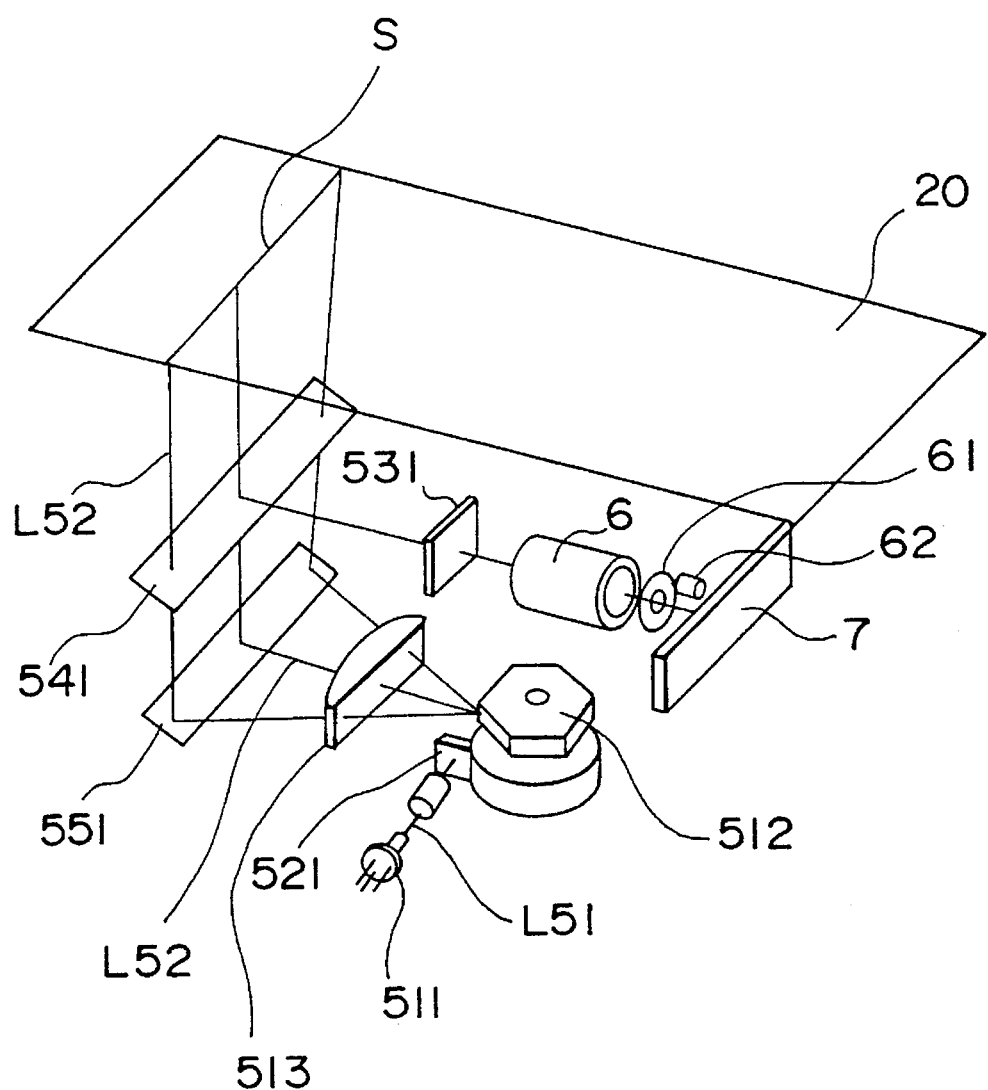
FIG. 8 is a cross-sectional view showing an optical reading system of a fifth embodiment of the image reading apparatus according to the present invention.
Figure 9:
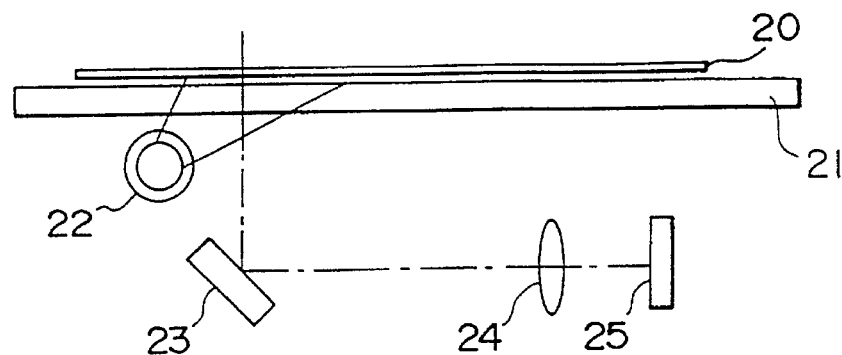
FIG. 9 is an illustration showing a prior art image reading apparatus.
Figure 10:
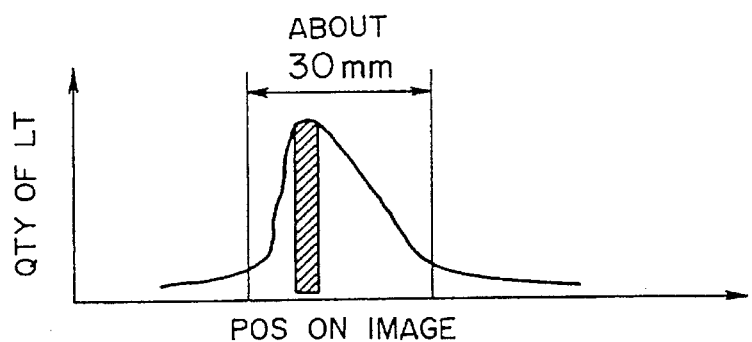
FIG. 10 is a graphical representation showing a distribution of the quantity of light for illuminating an object to be image read in the prior art image reading apparatus.
Figure 11:
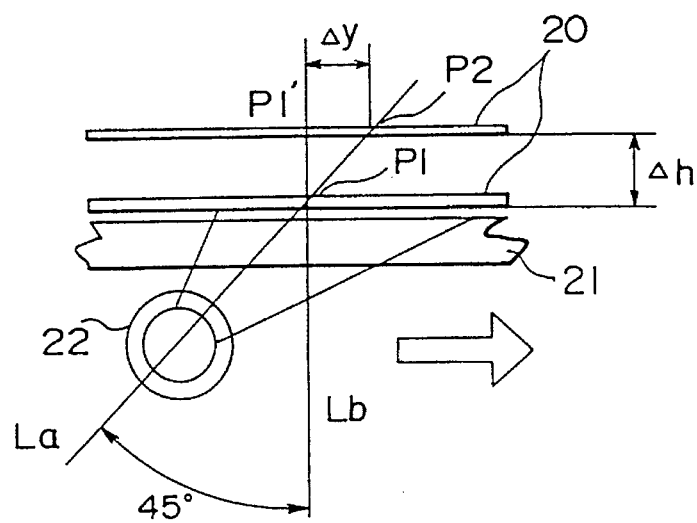
FIG. 11 is an enlarged view showing the image reading position in the prior art image reading apparatus shown in FIG. 9.

FIG. 8 shows a fifth embodiment of the present invention. In this embodiment, a high-directivity laser light L51 emitted by a laser light emitting element 511 is transformed into linearly polarized light, and scanned by a rotating polygonal mirror 512. The scanned light L52 is passed through a fθ lens 513, reflected at a right angle by a mirror 551, passed through a half mirror 541, and then introduced upon a reading line S of an object 20 to be image read. The reflected light is reflected by the half mirror 541, passed through a second polarizing element 531 to remove the regular reflection light, and then image formed on the CCDs 7 through the image forming system 6.

In this embodiment, since a laser light having an ideal directivity is adopted, it is possible to provide an image reading apparatus high in illumination efficiency and further to reduce the power consumed by the illumination unit markedly.

As described above, in the apparatus according to the present invention, linearly polarized light is irradiated upon an object to be image read; the regular reflection light component of the light reflected from the object and located on substantially the same plane as the linearly polarized light is shuttled by the polarizing element arranged in the direction perpendicular to the polarization plane of the regular reflection light component; and the diffused light component of the reflected light is image formed on the light-electricity transducing elements via the polarizing element.

As described above, according to the present invention, in the image reading apparatus provided with an illumination unit for illuminating an object to be image read, and an image forming system for image forming the light reflected from the object on light-electricity transducing elements, since the major illumination light emitted from the illumination unit and the light reflected from the object and introduced onto the light-electricity transducing elements are both located on the same plane, it is possible to provide an image reading apparatus high in the illumination efficiency, which can illuminate the image reading position effectively.

Further, since the illumination efficiency of the illumination unit is high, the light output of the illumination unit can be reduced and thereby it is possible to provide a compact image reading apparatus of high image reading speed.

I claim:

1. An image reading apparatus comprising:

light illuminating means for illuminating an object to be image read substantially perpendicularly to the object with linearly polarized light having an illumination width determined by a width to be image read and obtaining reflected light substantially perpendicularly from the object, the reflected light having a first, regular reflection light component and a second reflection light component;

shutting means for shutting out the first, regular reflection light component and passing the second reflection light component; and light-electricity transducing means for transducing the passed second reflection light component into electric signals.

2. The image reading apparatus of claim 1, wherein said light illuminating means comprises a light source for generating irregular polarized light; and a first polarizing element for producing the linearly polarized light from irregular polarized light.

3. The image reading apparatus of claim 1, wherein said shutting means comprises a second polarizing element for passing the linearly polarized light and having a polarization plane perpendicular to a polarization plane of the regular reflection light component.

4. The image reading apparatus of claim 1, wherein said light-electricity transducing means comprises a plurality of light-electricity transducing elements arranged one-dimensionally;

and said image reading apparatus further comprises;

an image forming system for image forming the reflection light component onto a plurality of said light-electricity transducing elements; and a diaphragm for changing a focal depth of said image forming system.

5. The image reading apparatus of claim 1, wherein said shutting means comprises;

a quarter wavelength element for transforming the linear polarized light for illuminating the object into a first circular polarized light, and for transforming the regular reflection light component reflected from the object, as a second circular polarized light, into linearly polarized regular reflection light having a polarization plane perpendicular to that of the linearly polarized light; and a polarized beam splitter for passing the linearly polarized regular reflection light in a direction parallel to a direction in which the linear polarized light is given to the object and allowing passing therethrough a reflection light component reflected from the object other than the regular reflection light component.

* * * * *